United States Patent [19]
Barnaby

US005572798A

[11] Patent Number: 5,572,798
[45] Date of Patent: Nov. 12, 1996

[54] METROLOGICAL APPARATUS

[75] Inventor: Anthony B. Barnaby, Markfield, Great Britain

[73] Assignee: Rank Taylor Hobson Limited, England

[21] Appl. No.: 256,324

[22] PCT Filed: Jan. 8, 1993

[86] PCT No.: PCT/GB93/00037

§ 371 Date: Jul. 8, 1994

§ 102(e) Date: Jul. 8, 1994

[87] PCT Pub. No.: WO93/14367

PCT Pub. Date: Jul. 22, 1993

[30] Foreign Application Priority Data

Jan. 8, 1992 [GB] United Kingdom ............ 9200280

[51] Int. Cl.⁶ ............................................ G01B 5/00
[52] U.S. Cl. ........................................... 33/549; 33/1 M
[58] Field of Search ........................... 33/503, 549, 555, 33/556, 557, 1 M, 550, 707

[56] References Cited

U.S. PATENT DOCUMENTS

| | | | |
|---|---|---|---|
| 4,483,079 | 11/1984 | Band et al. ............................ | 33/503 |
| 4,887,360 | 12/1989 | Hemmelgarn et al. ............... | 33/1 M X |
| 4,947,557 | 8/1990 | Gapshis et al. . | |
| 5,148,600 | 9/1922 | Chen et al. ............................ | 33/503 X |
| 5,333,386 | 8/1994 | Breyer et al. ........................ | 33/503 X |

FOREIGN PATENT DOCUMENTS

| | | |
|---|---|---|
| 1516735 | 10/1989 | U.S.S.R. ................... 33/503 |
| 911336 | 11/1962 | United Kingdom . |
| 1137238 | 12/1968 | United Kingdom . |
| 2112522 | 7/1983 | United Kingdom . |
| 2160975 | 1/1986 | United Kingdom . |
| 2179452 | 3/1987 | United Kingdom . |
| 2207505 | 2/1989 | United Kingdom . |
| 2227563 | 8/1990 | United Kingdom . |

OTHER PUBLICATIONS

Koordinatenmessgeräte, Fertigungsmesstechnik, Handbuch für Industrie und Wissenschaft, 1984, pp. 271 to 276.

*Primary Examiner*—G. Bradley Bennett
*Attorney, Agent, or Firm*—Lerner, David, Littenberg, Krumholz & Mentlik

[57] ABSTRACT

A metrological apparatus has a movable arm 15 which moves up and down between two bearing members 13, both of which define datum positions for the arm 15. The arm 15 has air bearings on the bearing members 13, so that it adopts a position equidistant between the bearing members 13. In this way, the position of the arm 15 contains the average of the errors in the two datum positions defined by the bearing members 13. Where the bearing members 13 have symmetric errors, these will be cancelled. Since the path of maximum straightness of movement of the arm 15 is spaced from the bearing members 13, it is possible to put a workpiece 3 in this path and a turntable 5 for supporting the workpiece 3 is arranged to have its rotational axis in line with the path of maximum straightness. The vertical position of each end of the arm 15 is measured using a respective grating 25 and the average of the measurements is taken to provide an accurate measurement of the height of the centre point of the arm 15 over the workpiece 3, substantially free of Abbé errors.

40 Claims, 3 Drawing Sheets

METROLOGICAL APPARATUS

The present invention relates to metrological apparatus. Typically, such apparatus carries a stylus and is used for measuring the surface of a workpiece contacted by the stylus, for example to determine the form or shape of the workpiece.

In a known form of metrological apparatus, an arm is movably mounted on a support structure, and carries the stylus. The stylus is typically provided as part of a probe which may be movable along the arm. In use, the arm is supported over a work table on which the workpiece is placed. The support structure may be made movable to carry the arm over the work table. Alternatively, the work table may comprise a turntable, in which case the support structure is typically not movable relative to the turntable, but the arm is movable towards or away from the turntable.

In such a prior art structure, the support structure includes a bearing member, which acts as a datum. The arm bears against the bearing member as it moves relative to the support structure, and the bearing member defines its position. A measuring means, for example an optical grating, will typically be mounted close to the bearing member, for providing a measurement of the position of the arm along the bearing member. In this configuration, a number of factors act to limit the accuracy with which the position of the stylus can be measured, thereby limiting the accuracy with which the surface of the workpiece can be measured.

The bearing member, acting as a datum, theoretically constrains the arm to move precisely in a predetermined direction, which is typically a straight line. However, any inaccuracies in the manufacture or mounting of the bearing member will cause corresponding inaccuracies in the movement of the arm, so that the positioning of the arm cannot be more accurate than the positioning and shape of the bearing member.

Any deviations of the position of the arm from its correct intended path will tend to increase with distance along the arm away from the bearing member. If the arm is intended to move in a straight line, the part of the arm contacting the bearing member will normally have the straightest path. In order to ensure comparability between different measurements of the workpiece surface, made by contacting the workpiece with the stylus at different positions of the arm relative to the support structure, the workpiece should be placed in the line where the arm follows most closely its perfect intended path. However, this is the place where the arm contacts the bearing member which acts as a datum, and consequently the presence of the bearing member obstructs the workpiece and it cannot be positioned there. Accordingly, when the stylus is contacting a workpiece, movement of it in the direction of movement of the arm will follow a path which tends to be less accurate (typically less straight) than the datum path defined by the bearing member.

The position of the arm relative to the support structure is typically measured by use of a measuring means provided close to the bearing member acting as a datum. This is inevitably spaced from the position of the stylus and the workpiece. Consequently, the precise position of the stylus in the direction of movement of the arm cannot be determined owing to errors known as Abbé errors. These errors can arise from twisting the arm or from inaccuracies in its movement due to inaccuracies in the datum, and mean that the precise position of the arm at the point where the stylus is located cannot be determined exactly from measuring the position of the arm at the location of the measuring means.

According to an aspect of the present invention, there is provided a metrological apparatus having a support structure with first and second spaced apart parallel bearing members, both acting as datums, and an arm carrying a stylus which bears against both bearing members. The bearings between the arm and the bearing members are of a form in which the clearance between the arm and each of the bearing members adjusts automatically. Typically, the bearings are arranged so that the arm remains centred, substantially equidistant between the bearing members. This can conveniently be provided by bearings which act to repel the arm from the bearing members, such as air bearings or hydrostatic oil bearings.

In such an arrangement, the path followed by the arm will be an average of the datum paths defined by the bearing members. If the bearing members have been manufactured using identical procedures on the same apparatus, any systematic errors of manufacture will be the same for the bearing members. They can be mounted such that any concavity or convexity of them is provided as a mirror image, and any sideways curvature is in opposite directions. In this case, if the arm is kept equidistant between the two bearing members equal degrees of concavity or convexity of the bearing members cancel out. Any sideways curvature of the bearing members will cause the arm to rotate. If the curvatures are equal the part of the arm halfway between the bearing members will rotate without displacement, and the paths of all parts of the arm between the bearing members will be closer to the desired path than the datum paths defined by the bearing members.

In this way, this aspect of the invention will in appropriate circumstances provide a path for the arm and the stylus having less deviation from the correct intended path than the datum provided by either bearing member.

Additionally, since the best path of the arm is provided for a part of the arm spaced from the bearing members, the workpiece can be placed in the line of the best path without being obstructed by the bearing members.

Where a turntable is provided for mounting a workpiece, the turntable axis is preferably aligned to pass substantially in line between the bearing members, and also preferably passes midway between them. This tends to ensure that the arm has a relatively error-free path of movement at the turntable axis.

The stylus may be arranged to have a position substantially in line between the bearing members, or a position midway between them, or both. This tends to ensure that the path of movement of the stylus as the arm moves is relatively error-free.

In another aspect of the present invention, there is provided a metrological apparatus having an arm carrying a stylus for contacting a workpiece, and movable over a support structure, and first and second measuring means for measuring the movement of the arm relative to the support structure. The first and second measuring means are provided spaced apart, preferably one either side of the stylus. A processing means receives measurements from both of the measuring means, and determines the position of the arm from them typically by averaging. This allows a determination to be made of the position of a point on the arm spaced from both measuring means, which determination is compensated for tilts in the axis of the arm extending between the two measuring means. In this way, Abbé errors can be substantially reduced or even eliminated.

For example, if a measuring means is provided at each end of the arm and an unweighted average is taken of the positions measured by the measuring means, this will give a measure of the position of the midpoint of the arm substantially free of Abbé errors. If the workpiece is placed in line with this part of arm, the height of the stylus when it is contacting the workpiece can be determined substantially free of Abbé errors. In other arrangements, for example where the stylus is positioned closer to one of the measuring means than the other, it may be preferable to use a weighted average rather than an unweighted average.

Where a turntable is provided for mounting a workpiece, the turntable axis is preferably aligned to pass substantially in line between the measuring means. The axis preferably extends midway between the measuring means. The stylus may be arranged to have a position substantially in line between the measuring means, or a position midway between them, or both.

The two aspects of the present invention can advantageously be combined, and in this way a relatively simple metrological apparatus can be provided in which the position of the stylus in the direction of movement of the arm can be determined with a high degree of accuracy when the stylus is contacting the workpiece. In this arrangement, the arm extends between two bearing members, each providing a datum, by means of bearings which centre the arm between them, and each end of the arm is associated with a measuring means. The midpoint of the arm tends to follow the most accurate path as the arm is moved over the bearing members, and the position of this midpoint is determined by taking an unweighted average of the measurements from the measuring means. A turntable is provided for mounting a workpiece to be contacted by the stylus, and the rotational axis of the turntable is substantially aligned with the midpoint of the arm and is substantially parallel with the direction of movement of the arm. In such an arrangement, a stylus carried on the arm may be used for measuring surfaces of revolution such as cylinders and cones mounted co-axially on the turntable.

In another aspect of the present invention there is provided a drive mechanism comprising first and second screw-threaded members, threadingly inter-engaged, such as a bolt and a nut, the first screw-threaded member being mounted on a first support member and the second screw-threaded member being mounted on a second support member, and the first screw-threaded member being drivable in rotation without rotation of the second screw-threaded member, so as to cause relative movement of the first and second support members in a direction along the axis of the screw thread for coarse positioning, and the second-threaded member being drivable in rotation without rotation of the first screw-threaded member, for fine adjustment of the distance between the first and second support members. For example, the second screw-threaded member may be driven by a worm-screw, for example engaging gear teeth on a circumferential surface of the second screw-threaded member, so that a complete rotation of the worm-screw rotates the second screw-threaded member by a relatively small proportion of a full rotation, for example no more than 5% and more preferably no more than 1%. In this way, rotation of the second screw-threaded member enables adjustment of the separation between the first and second support members by an amount which is a fraction of the screw pitch of the thread of the first and second screw-threaded members. Conveniently, the first screw-threaded member will be a bolt-form member and the second screw-threaded member will be a nut-form member. This drive mechanism can be used, for example, for raising and lowering the movable arm of a metrological apparatus as described above. By appropriate choice of the pitch of the screw thread and the number of gear teeth for engaging the worm-screw for the second screw-threaded member, it is possible to design a drive which can raise and lower the arm over a total range of about 300 mm, and position the arm to a precision of 1 μm.

Additionally, the entire support structure of a metrological apparatus may be made movable over a support surface, for example to move it between first and second workpiece support locations, and the above-described drive may be used to move the support structure of the metrological apparatus and position it accurately over the workpiece support locations.

An embodiment of the present invention, given by way of non-limiting example, will now be described with reference to the accompanying drawings in which.

Figure 1:
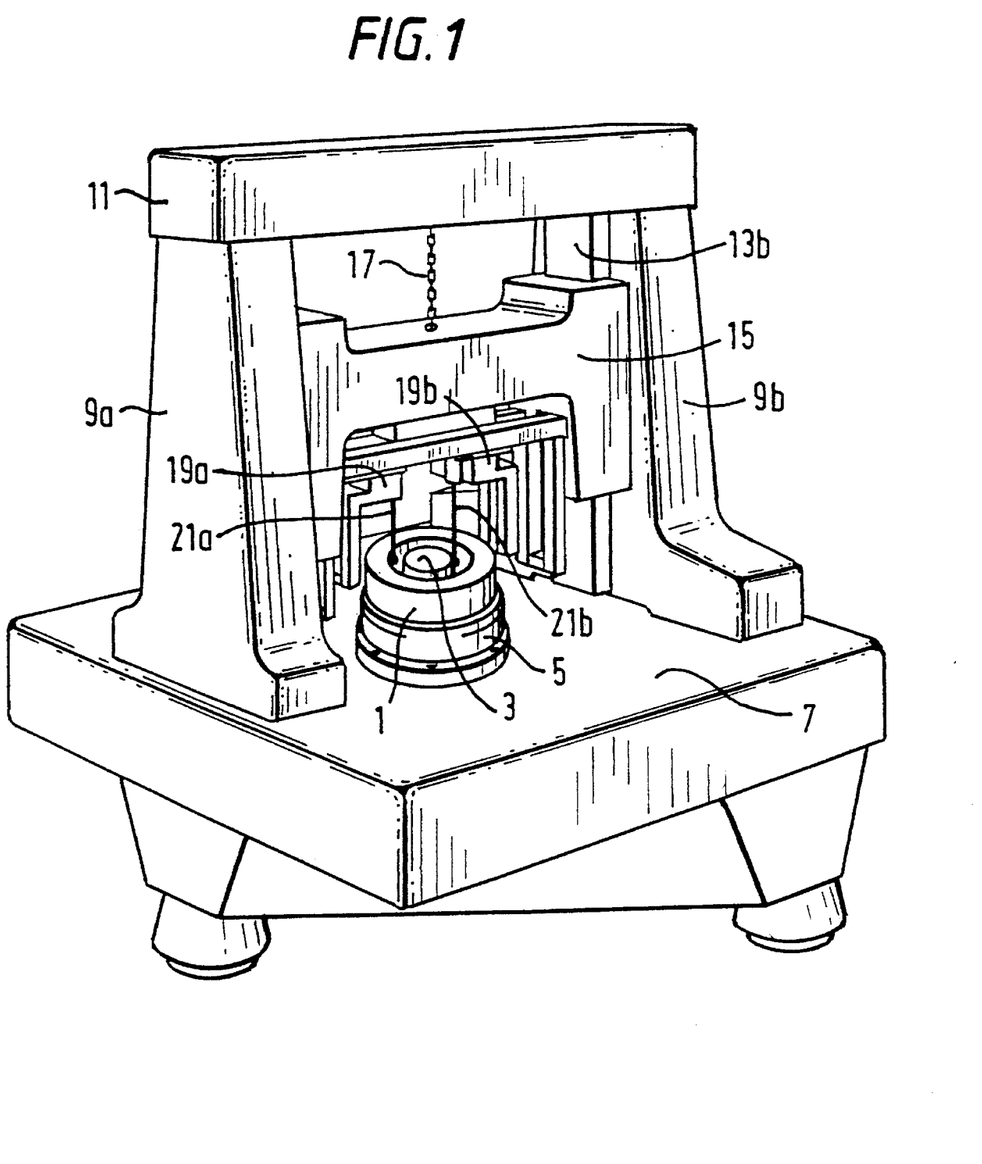
FIG. 1 is a perspective view of an embodiment of the present invention.

FIG. 1 shows a metrological apparatus for measuring the surface of a workpiece. As shown in the Figure the apparatus is set up to measure a surface by comparison with a highly accurate reference surface. In the Figure, the reference surface is the inner cylindrical surface of a ring-shaped reference member 1, and the surface being measured in the outer cylindrical surface of a cylindrical workpiece 3. The reference member 1 and the workpiece 3 are mounted on a turntable 5, provided as part of a workpiece table 7.

A support structure, essentially consisting of two upright members 9 and a crosspiece 11, sits on the workpiece table 7. Each one of the upright members 9a, 9b carries on its face towards the other one of the upright members 9a, 9b a bearing member 13a, 13b which is accurately machined and accurately mounted on the respective upright member 9a, 9b to provide a datum for an arm 15. The arm 15 is supported from the crosspiece 11 by a drive chain 17, which is fitted to the arm 15 substantially in line with its centre of gravity. The path of the arm 15 as it moves up and down under the effect of the drive chain 17, is determined by the bearing members 13a, 13b.

The arm 15 carries two probes 19a, 19b each movable along the arm 15 in a conventional manner, and each carries a respective stylus 21a, 21b for contacting the reference member 1 or the workpiece 3 respectively. Means are provided, in a manner known in the art, for measuring the displacement of the probes 19a, 19b along the arm 15, and interferometric measuring means is provided for determining the separation between the probes 19a, 19b to enable precise measurement of their mutual spacing.

Figure 2:
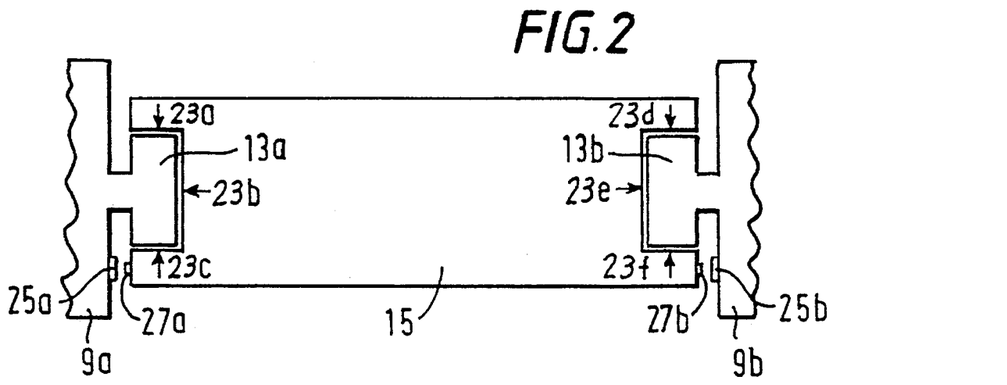
FIG. 2 is a schematic top view of the arm and part of the support structure of FIG. 1.

The arm 15 is mounted on the bearing members 13a, 13b with an air bearing which is represented schematically in FIG. 2 by arrows 23a, 23b, 23c, 23d, 23e, 23f. Jets of air from the arm 15 are directed against front and side surfaces of the bearing members 13a, 13b. The clearance between the arm 15 and each bearing member 13a, 13b across the air gap is designed to be approximately 15 μm. The air jets can be provided from a relatively low pressure air source, for example at about 300 to 350 kPa. As shown in FIG. 2, the bearing members 13a, 13b are mounted proud of the main surface of the upright members 9a, 9b and relatively large gaps are provided between the ends of the arm 15 and the upright members 9a, 9b. These large gaps allow air from the air bearing to escape without providing any unwanted bearing effect between the arm 15 and the upright members 9a, 9b and without creating turbulence in the air flow which could disrupt the positioning of the arm 15.

The air bearing does not substantially support the weight of the arm 15, which is supported by the drive chain 17, but acts to locate the arm 15 precisely against the bearing members 13a, 13b. When the air jets are turned on, the arm 15 is driven by the air jets into a position equidistant between the two bearing members 13a, 13b. As the arm 15 moves up and down the bearing members 13a, 13b under the influence of the drive chain 17, it will be maintained equidistant between the two bearing members 13a, 13b. Accordingly, if there are any errors in the datum positions provided by the bearing members 13a, 13b the path of the arm 15 contains the average of those errors.

The bearing members 13a, 13b are pieces of metal or stone (typically granite) which have been machined as accurately as possible, and aligned accurately on the support structure, preferably with a maximum error no greater than 10 to 20 percent of the size of the air gap of the air bearing. The bearing members 13a, 13b are manufactured using the same procedure and the same machinery as each other, so that they will tend to have the same manufacturing inaccuracies. Since the bearing members 13a, 13b are mounted facing each other, any concave or convex errors in the shape of the bearing members 13a, 13b will tend to be mirror images of each other, so that both bearing members will retreat from or approach the arm 15 at the same heights. These errors will tend to displace the arm 15 in opposite directions so that the position averaging effect of the air bearing results in the errors cancelling and the path of arm 15 being more accurate than the path defined by either bearing member 13a, 13b. Any side-to-side errors which appear in both bearing members 13a, 13b will tend to move the respective ends of the arm 15 in opposite directions. Consequently, such errors will tend to rotate the arm 15 and if the errors in the two bearing members are equal the centre point of the arm 15 will rotate without displacement. Thus, the path followed by all parts of the arm 15 as it moves up and down the bearing members will also tend to have reduced side-to-side errors as compared with the bearing members 13a, 13b and at the midpoint of the arm 15 such errors will substantially cancel out.

In practice, the errors introduced into the position of the arm 15 by inaccuracies of the bearing members 13a, 13b are unlikely to be precisely equal and opposite, so that the errors will not precisely cancel and the path of the arm 15 will not be precisely error free. However, if care is taken to ensure that the two bearing members 13a, 13b experience the same manufacturing process with the same equipment the path followed by the arm 15 will tend to have reduced errors compared with the bearing members 13a, 13b, and the straightest path during up and down movement of the arm 15 will tend to be followed by the midpoint of the arm 15.

Figure 3:
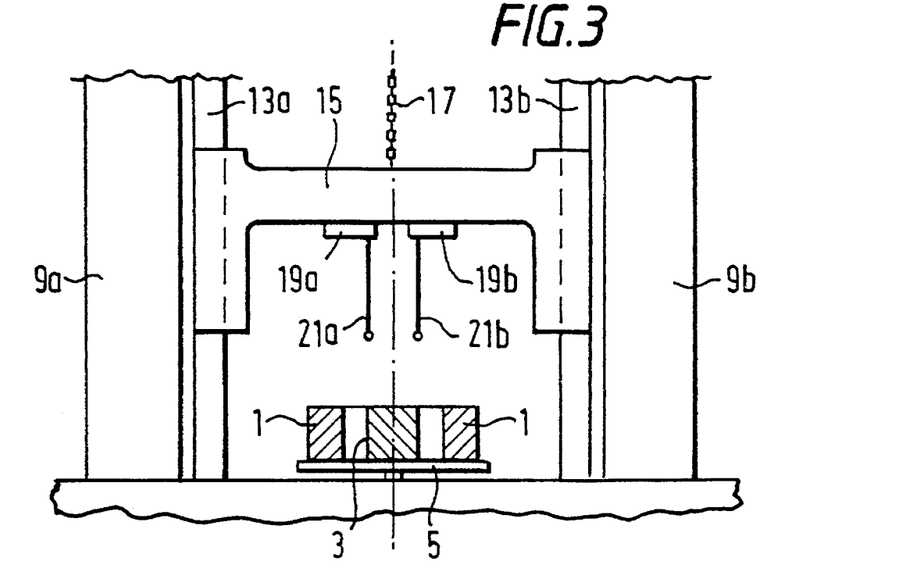
FIG. 3 is a schematic side view of the arm and part of the support structure of FIG. 1.

The path of the midpoint of the arm 15 is shown by a broken line in FIG. 3. The drive chain 15 is in line with this as the midpoint of the arm 15 will also tend to be its centre of gravity. As previously noted, this will tend to be the line of maximum straightness of movement of the arm 15. As can be seen from FIGS. 1 and 3 all parts of the support structure 9a, 9b 11 and the bearing members 13a, 13b are spaced from this line of maximum straightness. Accordingly, it is possible to arrange for the workpiece 3, the surface of which is to be measured, to be placed in or close to this line. As is shown in FIG. 3, the turntable 5 is mounted so that its spindle axis is aligned with this line of maximum straightness. Since the reference member 1 and workpiece 3 are mounted on the turntable 5, and the spindle of the turntable 5 is aligned with the line of maximum straightness, the styli 21a, 21b when contacting the reference member 1 and the workpiece 3, are close to the line of maximum straightness. Thus, as the arm 15 moves up and down during the surface measuring operation, the up and down movement of the styli 21a, 21b will follow a path having a straightness close to the maximum obtainable with the apparatus. This provides a good assurance that each stylus 21a, 21b moves in a straight line as the arm 15 is moved up and down, so that measurements of the surface of the reference member 1 and the workpiece 3 at different heights can be related to each other accurately, thereby allowing an accurate determination of the shape of the measured surfaces in the direction of movement of the arm 15.

In order to enable detection of the position of the arm 15 in the vertical direction as it moves up and down on the bearing members 13a, 13b grating type distance measuring devices are provided at each end of the arm. Such devices are well known to those skilled in the art and may be provided in a variety of configurations. Their presence is shown schematically in FIG. 2 by gratings 25a, 25b mounted on the upright members 9a, 9b and optical elements 27a, 27b mounted on the ends of the arm 15. The gratings 25a, 25b can be mounted on the upright members 9a, 9b to provide maximum linearity of measurement, in a manner which is known to those skilled in the art. Accordingly, the position sensed by each optical element 27a, 27b will be an accurate measurement of the position of the respective end of the arm 15. However, owing to Abbé errors, as previously discussed, these readings will not give the precise position of the centre of the arm, in the region over the turntable 5. Accordingly, the position measurement from each end of the arm 15 is taken and is averaged by a processing means 29, shown in FIG. 4, and the average between the respective positions of the two ends of the arm 15 is output as an arm position signal. The arm 15 is manufactured to be highly rigid, and therefore the average of the positions at its two ends represents an accurate measurement of the position half way along the arm 15, even if the arm 15 tilts by a variable amount. In this way, the position of the arm 15 in the vicinity of the axis of the turntable 5 can be determined substantially free of Abbé errors.

In FIG. 2, the two gratings 25a, 25b and optical elements 27a, 27b are shown at opposite ends of the arm 15 but both at the same side. In a modification, one of the gratings 25a, 25b and optical elements 27a, 27b can be moved to the other side of the bearing member 13a, 13b so that the two measuring systems are at diagonally opposite corners of the arm 15. Such an arrangement may assist in compensating for any twisting of the arm 15 about a line joining the two bearing members 13a, 13b.

Figure 4:
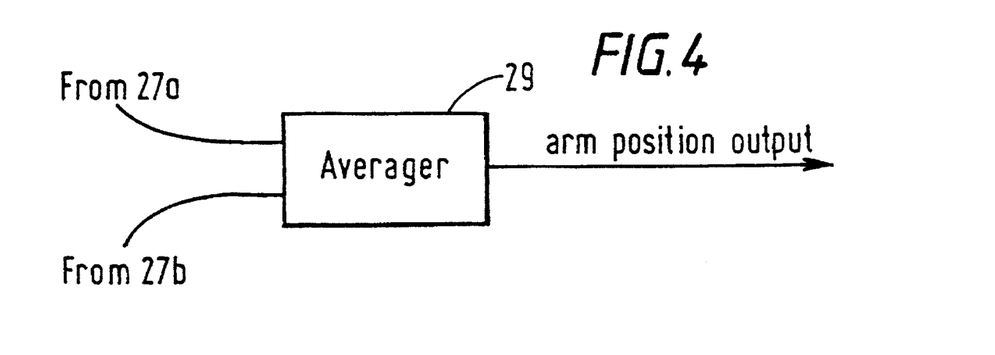
FIG. 4 is a block diagram of the processing of position information for the arm in the embodiment of FIG. 1.

In the illustrated embodiment the axis of the turntable 5 is positioned in line with the centre of the arm 15 which is expected to be the line of maximum straightness of movement of the arm 15, and additionally the processing means 29 uses an unweighted average of the positions detected by the two position measuring systems to determine the position of the centre point of the arm. Thus, the arm position output by the processing means 29 is effectively the position of the part of the arm over the axis of the spindle of the turntable 5. When the styli 21a, 21b are in contact with the reference member 1 and the workpiece 3, the positions of the probes 19a, 19b are used to determine the radii of the surfaces being measured from the turntable axis as it rotates, and variations in the radius from the turntable axis will cause movement of the relevant stylus 21a or 21b, which will be detected by the respective probe 19a, 19b. Accordingly, the axis about which the workpiece rotates and from which radius measurements are taken is the same as the axis of the arm height data output by the processing means 29, facilitating accurate computation of the surfaces being measured.

In an alternative, it may be preferred to determine the position of a point on the arm 15 away from the midpoint, for example, if it is desired to measure accurately up and down movements of a stylus 21a, 21b which is at a position spaced from the midpoint along the arm 15. In this case, the processing means 29 can be controlled to output an appropriately weighted average between the inputs it receives from the two measurement systems.

The arm 15 is provided with a plurality of flexible connections, which are not visible in the drawings and which will normally be hidden within one of the upright members 9a, 9b to carry pressurised air to the arm 15 for supply to the air bearings, and provide electrical connections for driving the probes 19a, 19b along the arm 15 and conveying various sense output signals from the arm to processing and output devices.

Figure 5:
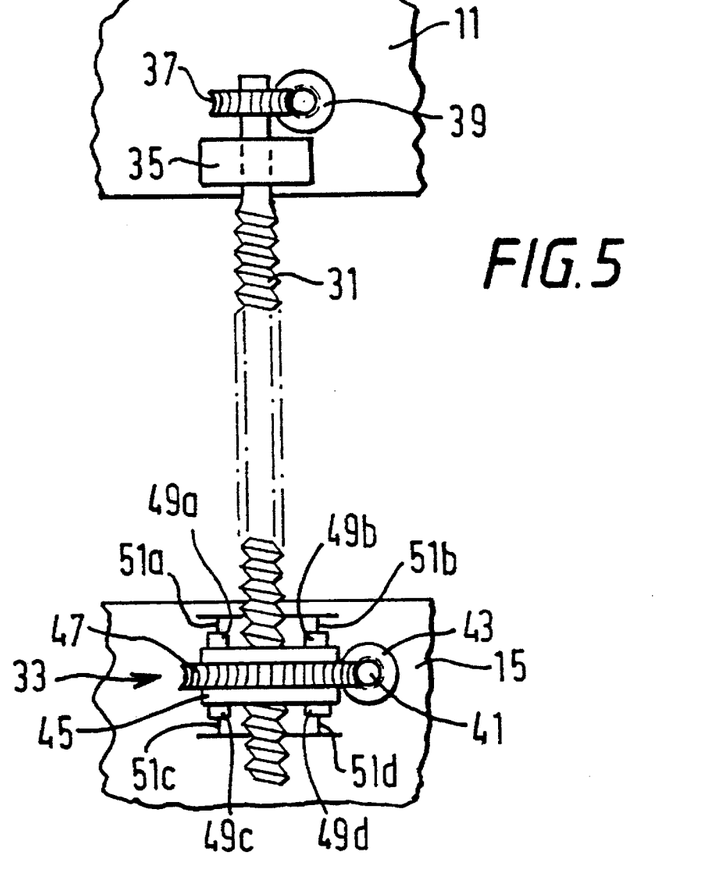
FIG. 5 is a schematic view of an alternative drive mechanism for the embodiment of FIG. 1.

FIG. 5 shows schematically an alternative drive mechanism for the arm 15, which allows more accurate vertical positioning of the arm 15 than can easily be achieved with a conventional drive using the chain 17. The drive mechanism of FIG. 5 comprises a screw-drive arrangement in which a rotating screw 31 drives a driven unit 33 which includes a captured nut 45. The screw 31 is mounted on the crosspiece 11 of the support structure through a thrust bearing 35. Just above the bearing 35, the screw 31 is provided with an integral cog wheel 37, which is engaged with a motorised drive means 39, for rotating the screw 31. As is conventional in screw drives, the driven unit 33 includes a captured nut 45 which runs on the screw 31, and which is held against rotation. Accordingly, rotation of the screw 31 by the motorised drive means 39 acting through the integral cog wheel 37 drives the captured nut up and down the screw 31, taking with it the driven unit 33. The driven unit 33 is mounted on the arm 15, and in this way the arm 15 is driven up and down.

Figure 6:
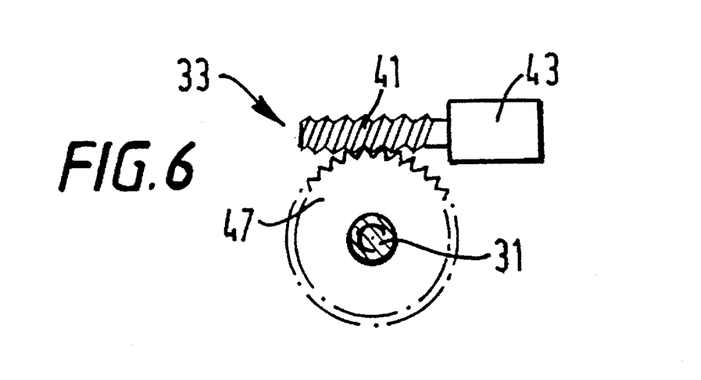
FIG. 6 is a schematic view of the worm-drive arrangement for the captured nut of the drive mechanism of FIG. 5.

In order to provide a fine adjustment of the distance between the arm 15 and the cross-piece 11, the captured nut 45 in the driven unit 33 is not held permanently against rotation, but can itself be rotated using a fine adjustment drive arrangement shown schematically in FIG. 6.

As shown in FIGS. 5 and 6, the driven unit 33 includes a worm-screw 41 and a motor 43 for driving the worm-screw, in addition to the captured nut 45. The captured nut 45 is formed with an integral cog wheel 47 and the gear teeth of this integral cog wheel 47 engage with the thread of the worm-screw 41, so that the motor 43 can drive the captured nut 45 through the worm-screw 41 and the integral cog wheel 47.

As is shown in FIG. 5, the captured nut 45 bears against bearings 49a, 49b, 49c, 49d which are in turn connected to the arm 15 by ligament springs 51a, 51b, 51c, 51d. The bearings 49a, 49b, 49c and ligament springs 51a, 51b, 51c, 51d prevent vertical movement of the captured nut 45 relative to the arm 15, so that the arm 15 is carried vertically with the captured nut 45 when there is relative rotation of the screw 31 and the captured nut 45. The bearings 49a, 49b, 49c, 49d allow the captured nut 45 to rotate relative to the arm 15 when the integral cog wheel 47 is driven by the worm screw 41. The ligament springs 51a, 51b, 51c, 51d allow horizontal relative movement between the arm 15 and the captured nut 45, so that the connection of the captured nut 45 to the crosspiece 11 through the screw 31 does not affect the manner in which the arm 15 is positioned by the air bearings.

During rotation of the screw 31 for coarse positioning, the captured nut 45 should be held against rotation. As is well known, a worm-screw drive can easily be designed so that the driven cog wheel, (i.e. integral cog wheel 47 of the captured nut 45) cannot drive the worm-screw in rotation. Thus the worm-screw drive system of FIG. 6 will act to prevent rotation of the captured nut 45 while the motor 43 is not driven, and accordingly no separate mechanism is required.

While the captured nut 45 is driven through the worm-screw 41 by the motor 43, for fine adjustment, the screw 31 should be held against rotation. This can be achieved through any convenient braking or clamping means, or the motorised drive means 39 can be constructed so as to prevent rotation of the screw 31 while the motorised drive means 39 is not driving it. Preferably the screw 31 is held against rotation by providing the motorised drive means 39 as a worm screw drive, as shown in FIG. 5.

The integral cog wheel 47 of the captured nut 45 may, for example, be formed with one hundred and eighty cog teeth, so that one hundred and eighty rotations of the worm-screw 41 are required in order to drive the captured nut 45 through one rotation. Consequently, one full rotation of the worm-screw 41 drives the captured nut 45 through 2 degrees, or 1/180 of a full rotation. Since a full rotation of the captured nut 45 will move the arm 15 relative to the cross-piece 11 by one pitch of the screw 31, one rotation of the worm-screw 41 will move the arm 15 by 1/180 of the pitch of the screw 31.

The integral cog wheel 37 of the screw 31 may be formed with twenty cog teeth, so that twenty rotations of the worm screw of the motorised drive means 39 are required to drive the screw 31 through one full rotation. Thus one rotation of the worm screw will drive the screw 31 through 18 degrees or 1/20 of a full rotation.

Therefore, if the two worm screws are driven by similar motors, driving of the screw 31 allows movement nine times faster than driving the captured nut 45, while driving the captured nut 45 allows a nine-fold increase in positioning accuracy of the arm 15 as compared with driving the screw 31. In this way, after the arm 15 has been driven to substantially the correct position by operation of the motorised drive means 39 for the screw 31, the precise position of the arm 15 can be adjusted by operation of the motor 43 for the worm-screw 41.

In the apparatus of FIG. 1, the vertical depth of the arm 15 might for example be 600 mm, and the drive mechanism might be used to raise or lower it over a total range of movement of 300 mm. Since the total range of movement is less than the vertical thickness of the arm 15, it is easy to design the arm 15 and position the driven unit 33 such that the screw 31 never needs to protrude through the bottom of the arm 15, and accordingly does not interfere with movement of the probes 19a, 19b. With such an arrangement, the worm-screw drive for the captured nut 45 can permit fine positioning of the height of the arm 15 to within 1 micrometre.

In a further modification of the apparatus of FIG. 1, two turntables 5 are provided at spaced apart locations on the workpiece table 7, and the support structure of upright members 9 and crosspiece 11 is movable across the workpiece table 7, carrying the arm 15, from one turntable 5 to the other. This allows a workpiece measuring operation to be carried out on the workpiece 3 mounted on one turntable 5, while another workpiece is being set up on the other turntable. With such an arrangement, it will normally be necessary to position the arm 15 to be accurately over the axis of rotation of the turntable 5, preferably to an accuracy of less than one micrometre. Accordingly, the drive mechanism illustrated in FIGS. 5 and 6 may also be used for driving the support structure relative to the workpiece table, so as to allow the arm 15, carrying the probes 19a, 19b to be driven from one turntable 5 to the other and positioned with the desired accuracy.

One embodiment of the present invention has been illustrated. Various modifications and alternatives will be apparent to those skilled in the art. Aspects of the invention can be used in other types of metrological apparatus than the type illustrated, for example in a co-ordinate measuring machine.

I claim:

1. Metrological apparatus comprising first and second bearing members extending substantially parallel to each other with a space between them, an arm extending between the bearing members and bearing on both of them for movement in the space between the bearing members, a stylus carried on the arm for contacting a workpiece, and bearings through which the arm bears on the bearing members, the bearing through which the arm bears on one of the bearing members tending to move the arm, to an extent dependent on the clearance between the arm and the bearing member, in a first direction parallel to the direction from one of the first and second bearing members to the other of the first and second bearing members, and the bearing through which the arm bears on the other bearing member tending to move the arm, to an extent dependent on the clearance between the arm and the bearing member, in a second direction, opposed to the first, so that the bearings determine the position of the arm taking into account its clearance from each bearing member.

2. Apparatus according to claim 1 in which the bearings tend to position the arm substantially equidistant between the bearing members.

3. Apparatus according to claim 1 in which the bearings act by repelling the arm from the bearing members.

4. Apparatus according to claim 3 in which the bearings are fluid pressure bearings.

5. Apparatus according to claim 4 in which the bearings are hydrostatic liquid bearings.

6. Apparatus according to claim 4 in which the bearings are gas bearings.

7. Apparatus according to claim 1 which further comprises a worktable for supporting the workpiece, and the arm is movable along the bearing members towards and away from the worktable.

8. Apparatus according to claim 1 in which the arm is movable along the bearing members substantially vertically.

9. Apparatus according to claim 1 which further comprises a turntable for mounting the workpiece.

10. Apparatus according to claim 9 in which the rotational axis of the turntable passes substantially in line between the first and second bearing members.

11. Apparatus according to claim 9 in which the rotational axis of the turntable is substantially equidistant from the first and second bearing members.

12. Apparatus according to claim 9 comprising first and second measuring means for measuring the position of the arm in the direction of its movement along the bearing members in the space between said bearing members, the measuring means being spaced apart from each other in a direction transverse to the said direction of movement, and processing means for receiving measurements of the position of the arm from the first and second measuring means and determining therefrom the position in the first direction of a part of the arm spaced from both of the said measuring means.

13. Apparatus according to claim 12 in which the rotational axis of the turntable passes substantially in line between the first and second measuring means.

14. Apparatus according to claim 12 in which the rotational axis of the turntable is substantially equidistant from the first and second measuring means.

15. Apparatus according to claim 1 in which the said stylus has a position substantially in line between the first and second bearing members.

16. Apparatus according to claim 1 in which the said stylus has a position substantially equidistant from the first and second bearing members.

17. Apparatus according to claim 1 comprising first and second measuring means for measuring the position of the arm in the direction of its movement along the bearing members in the space between said bearing members, the measuring means being spaced apart from each other in a direction transverse to the said direction of movement, and processing means for receiving measurements of the position of the arm from the first and second measuring means and determining therefrom the position in the first direction of a part of the arm spaced from both of the said measuring means.

18. Apparatus according to claim 17 in which the first and second measuring means are provided at the first and second bearing members, respectively.

19. Apparatus according to claim 17 in which the processing means averages the measurements of the position of the arm received from the first and second measuring means.

20. Metrological apparatus according to claim 19 in which the processing means gives equal weight to the measurements received from the first and second measuring means in performing the said averaging.

21. Apparatus according to claim 19 in which the processing means give unequal weights to the measurements received from the first and second measuring means in performing the said averaging.

22. Apparatus according to claim 17 in which the stylus has a position substantially in line between the first and second measuring means.

23. Apparatus according to claim 17 in which the stylus has a position substantially equidistant from the first and second measuring means.

24. Apparatus according to claim 17 in which the first and second measuring means comprise grating distance measuring means.

25. Apparatus according to claim 17 in which the first and second measuring means comprise optical interferometric measuring means.

26. Apparatus according to claim 1 in which the said stylus is movable along the arm.

27. Apparatus according to claim 1 in which the arm carries more than one stylus.

28. Metrological apparatus comprising an arm carrying a stylus for contacting a workpiece, the arm being movable in a first direction relative to a support structure, first and second measuring means for measuring the position of the arm in the first direction, the first and second measuring means being spaced apart from each other in a second direction transverse to the first, and processing means for receiving measurements of the position of the arm from the first and second measuring means and determining therefrom the position in the first direction of a part of the arm spaced from both of the said measuring means.

29. Apparatus according to claim 28 which further comprises a turntable for mounting a workpiece.

30. Apparatus according to claim 29 in which the rotational axis of the turntable passes substantially in line between the first and second measuring means.

31. Apparatus according to claim 29 in which the rotational axis of the turntable is substantially equidistant from the first and second measuring means.

32. Apparatus according to claim 28 in which the processing means averages the measurements of the position of the arm received from the first and second measuring means.

33. Metrological apparatus according to claim 32 in which the processing means gives equal weight to the measurements received from the first and second measuring means in performing the said averaging.

34. Apparatus according to claim 32 in which the processing means give unequal weights to the measurements received from the first and second measuring means in performing the said averaging.

35. Apparatus according to claim 28 in which the stylus has a position substantially in line between the first and second measuring means.

36. Apparatus according to claim 28 in which the stylus has a position substantially equidistant from the first and second measuring means.

37. Apparatus according to claim 28 in which the first and second measuring means comprise grating distance measuring means.

38. Apparatus according to claim 28 in which the first and second measuring means comprise optical interferometric measuring means.

39. Apparatus according to claim 28 in which the said stylus is movable along the arm.

40. Apparatus according to claim 28 in which the arm carries more than one stylus.

* * * * *

UNITED STATES PATENT AND TRADEMARK OFFICE
CERTIFICATE OF CORRECTION

PATENT NO.  : 5,572,798
DATED       : November 12, 1996
INVENTOR(S) : Barnaby

It is certified that error appears in the above-identified patent and that said Letters Patent is hereby corrected as shown below:

Column 6, line 46, "$27a, 27b$" should read --$27a$ or $27b$--

Column 6, line 47, "$13a, 13b$" should read --$13a$ or $13b$--

Column 6, line 67, "$19a, 19b$" should read --$19a$ or $19b$--

Column 7, line 8, "$21a, 21b$" should read --$21a$ or $21b$--

Column 7, line 55, "bearings $49a, 49b, 49c$" should read --bearings $49a, 49b, 49c, 49d$--

Signed and Sealed this

Nineteenth Day of August, 1997

*Attest:*

BRUCE LEHMAN

*Attesting Officer*  *Commissioner of Patents and Trademarks*